United States Patent Office 2,852,522
Patented Sept. 16, 1958

2,852,522

10,11-DIHYDROXY AND 10,11-EPOXY-STEARIC ACID AND DERIVATIVES

Joseph Nichols, Princeton, N. J., assignor to Ethicon, Inc., a corporation of New Jersey No Drawing. Application July 1, 1957
Serial No. 668,928

8 Claims. (Cl. 260—295)

This invention relates to 12-keto-10,11-epoxystearic acid and 12-keto-10,11-dihydroxy stearic acid and salts thereof and has among its objects the production of such compounds.

My U. S. Patent No. 2,623,888, December 30, 1952, discloses the preparation of 12-ketooleic acid and 12-keto-elaidic acid and esters thereof by the oxidation of the 12-hydroxy group of ricinoleic acid and ricinelaidic acid and their esters to the 12-keto group by means of chromic acid, preferably in the presence of sulfuric acid, all reactants being in solution in glacial acetic acid. In addition, my patent discloses that 12-keto-10,11 octadecenoic acid may be prepared from 12-ketooleic acid or 12-ketoelaidic acid by a reaction in glacial acetic acid with concentrated sulfuric acid.

I have now discovered that 12-keto-10,11-epoxystearic acid having the formula

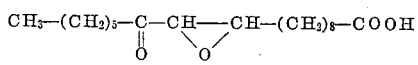

and 12-keto-10,11-dihydroxystearic acid having the formula

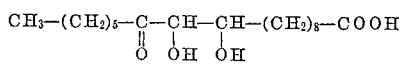

may be prepared by the oxidation of 12-keto-10,11-octadecenoic acid with hydrogen peroxide. Oxidation with hydrogen peroxide leading to the production of 12-keto-10,11-epoxystearic acid is conducted in an alkaline medium at a low temperature and is preferably conducted at a temperature not above $-5°$ C. in the presence of magnesium chloride, which acts as a catalyst. Oxidation with hydrogen peroxide leading to the production of 12-keto-10,11-dihydroxy stearic acid is conducted in solution in anhydrous tertiary butyl alcohol or in solution in anhydrous ether in the presence of a catalytic amount of osmium tetroxide, and preferably at a temperature not exceeding 50° C.

For the purpose of illustrating my invention Examples 1 to 3 are set forth below in order to show the methods of preparing 12-keto-10,11-epoxystearic acid and 12-keto-10,11-dihydroxy stearic acid by the oxidation of 12-keto-10,11-octadecenoic acid. I wish it to be understood, however, that these examples are set forth by way of illustration and not of limitation.

EXAMPLE 1

*Preparation of 12-keto-10,11-epoxystearic acid*

A solution of 38 grams of potassium hydroxide in 166 milliliters of water and 420 milliliters of methanol and a solution of 174 milliliters of 30% hydrogen peroxide were added simultaneously over a period of one-quarter hour to a stirred solution of 100 grams of 12-keto-10,11-octadecenoic acid, 19 grams of potassium hydroxide, and four grams of magnesium chloride in eight liters of methanol. The temperature of the reaction mixture was kept at $-5°$ C. during the addition. After the addition was complete, the reaction mixture was stirred at room temperature for one and one-half hours and then maintained at 0° C. for two days. The solution was acidified with ten liters of 0.10-normal hydrochloric acid and sufficient water was added to bring the volume to 40 liters. The precipitate which formed was removed from the reaction mixture, washed with water and recrystallized from 90% ethanol. 74 grams of 12-keto-10,11-epoxystearic acid having a melting point of 69.5° C. to 70° C. were obtained. Carbon and hydrogen analyses gave the following results; calculated for $C_{18}H_{32}O_4$; carbon equals 69.19%, hydrogen equals 10.33%; found, carbon equals 69.26% and hydrogen equals 10.44%.

EXAMPLE 2

*Preparation of 12-keto-10,11-dihydroxystearic acid*

Four milliliters of 1% ethereal osmium tetroxide solution were added to a combined solution of 5.2 grams of 12-keto-10,11-octadecenoic acid in 20 milliliters of tertiary butyl alcohol and 12 milliliters of an anhydrous oxidizing solution containing 5.0 to 5.1% hydrogen peroxide in tertiary butyl alcohol. After a period of about five minutes, the oxidation commenced spontaneously and cooling was applied to the reaction mixture in order to maintain the temperature at not above 50° C. After 12 hours at room temperature, the solvents were removed from the reaction mixture under reduced pressure and ice water was added to the dark oily residue remaining. The brown solid which was formed upon the addition of ice water was leached with 100 milliliters of hot petroleum ether (boiling point 30–60° C.) to remove any unreacted 12-keto-10,11-octadecenoic acid and the residual material was recrystallized successively from equal parts by weight of ether and petroleum ether and from 40% aqueous ethanol, the solution in each case being decolorized with animal charcoal. 0.8 gram of 12-keto-10,11-dihydoxystearic acid having a melting point of 99° C. to 100° C. were obtained. Carbon and hydrogen analyses gave the following results; calculated for $C_{18}H_{34}O_5$, carbon equals 65.42%, hydrogen equals 10.37%; found, carbon equals 65.48% and hydrogen equals 10.32%.

EXAMPLE 3

*Preparation of 12-keto-10,11-dihydroxystearic acid*

75 milliliters of 90% hydrogen peroxide and 150 milliliters of a 1% ethereal osmium tetroxide solution were successively added to a stirred solution of 150 grams of 12-keto-10,11-octadecenoic acid in solution in three liters of absolute ether. The reaction mixture was maintained at a temperature of 15–20° C. during the addition and after the addition was complete, stirring of the reaction mixture continued for 15 minutes. The reaction mixture was then maintained at 0° C. for twelve hours, during which time the precipitate was formed. The precipitate was removed from the solution, and the filtrate was diluted with twelve liters of petroleum ether (boiling point 30° C. to 60° C.) and the solution was cooled to $-20°$ C. A white precipitate was formed, removed by filtration and added to the original precipitate. The combined precipitates were suspended in one liter of water and stirred for one hour. The water was removed and the solid was dissolved in 500 cc. of hot 95% ethyl alcohol and decolorized with animal charcoal. Sufficient water was added to the solution to bring the concentration of alcohol therein to 40%. The precipitate formed by the addition of water to the alcohol solution was removed, dried, and recrystallized from a mixture of petroleum ether (boiling point 30° C. to 60° C.) and ether, the proportion of petroleum ether to ether by volume being 4 to 1. 30 grams of 12-keto-10,11-dihydroxystearic acid, having a melting point of 99° C. to 100° C. were obtained.

Both 12-keto-10,11-epoxystearic acid and 12-keto-10,11-dihydroxystearic acid may be readily converted into salts having substantially more solubility in water than the free acid. Salts prepared by reacting the acid with inorganic bases, such as sodium, potassium and ammonium hydroxide, as well as organic amines such as diethanol amine, triethanol amine, pyridine, and primary, secondary, and tertiary aliphatic amines in general have solubility in water several times greater than the free acid.

As an example thereof, 312 parts of 12-keto-10,11-epoxystearic acid in ethyl alcohol solution were reacted with 56.1 parts of potassium hydroxide in ethyl alcohol solution, yielding 350 parts of the 12-keto-10,11-epoxystearic acid potassium salt after removal of the solvent. This had a considerably greater solubility in water than the free acid.

Similarly, 330 parts of 12-keto-10,11-dihydroxystearic acid in ethyl alcohol solution were reacted with 56.1 parts of potassium hydroxide in ethyl alcohol solution, yielding 368.1 parts of the 12-keto-10,11-dihydroxystearic acid potassium salt after removal of the solvent. It also had a considerably greater solubility in water than the free acid.

When stoichiometric amounts of sodium hydroxide, ammonium hydroxide, diethanol amine, triethanol amine and pyridine are reacted with 12-keto-10,11-epoxystearic acid and 12-keto-10,11-dihydroxystearic acid, respectively, the resulting salts are formed, and these salts all have a considerably greater solubility in water than the free acid.

The novel acids, 12-keto-10,11-epoxystearic acid, 12-keto-10,11-dihydroxystearic acid, and their salts may be used for a number of different purposes in a wide variety of fields. They may be employed as intermediates in further chemical syntheses or as finished products. In the latter category, they find use in the inhibition of the growth of microorganisms, and particularly fungi and mycobacteria. As intermediates, the acids may be converted into amides, or reacted with alcohols to make esters.

For instance, 9.36 parts of 12-keto-10,11-epoxystearic acid were treated with 4.11 parts of isobutylchloroformate to form the mixed anhydride of these two acids, which was then converted to the dimethylaminoethyl ester of 12-keto-10,11-epoxystearic acid, as disclosed in copending application Serial No. 506,354, filed May 5, 1955, by Nichols and Schipper.

Similarly, the mixed anhydride prepared from 12-keto-10,11-epoxystearic acid and isobutylchloroformate was converted to N-beta-diethylaminoethyl-12-keto-10,11-epoxystearamide by reaction with beta-diethylaminoethylamine, as disclosed in copending application Serial No. 506,352, filed May 5, 1955, by Nichols and Schipper. That application also discloses the preparation of amides of 12-keto-10,11-dihydroxystearic acid.

EXAMPLE 4

Both compounds prepared according to the foregoing examples were tested for activity against *Mycobacterium tuberculosis* H37R$_a$ and 12-keto-10,11-dihydroxystearic acid was tested for activity against *Mycobacterium tuberculosis* H37R$_v$ according to the method of A. W. Frisch and M. S. Tarshis, American Review of Tuberculosis, vol. 64, page 551 (1951). 12-keto-10,11-dihydroxystearic acid completely inhibited the growth of both of these organisms at a concentration of one hundred micrograms per milliliter, and 12-keto-10,11-epoxystearic acid completely inhibited the growth of *Mycobacterium tuberculosis* H37R$_a$ at a concentration of 500 micrograms per milliliter.

The compounds prepared according to the foregoing examples were tested for activity against *Coccidioides immitis, Candida albicans* and *Cryptococcus neoformans* by a serial dilution method given by the following procedure:

The compounds were sterilized by exposure to propylene oxide for three days and 0.25 milliliter of sterile aqueous solution containing twenty milligrams of compound per milliliter of solution was added to 4.5 milliliters of sterile Mycophil broth, the broth then being serially diluted with additional sterile broth to provide solutions of five milliliters total volume containing 1000, 500, 100, 10, 1, 0.1, and 0.01 micrograms of compound per milliliter of solution. One milliliter portions of seventy-two hour Mycophil broth cultures of *Coccidioides immitis, Candida albicans* and *Cryptococcus neoformans* were added to ninety-nine milliter portions of sterile Mycophil broth and 0.2 milliliter portions of the diluted cultures were added to each of the serial dilutions containing the test compounds and the inoculated tubes were incubated at 25° C. for five days. All of the compounds completely inhibited the growth of *Coccidioides immitis, Candida albicans* and *Cryptococcus neoformans* at a concentration of 1000 micrograms per milliliter.

This application is a continuation-in-part of my application Serial No. 397,482, filed December 10, 1953, now abandoned.

It is apparent that many widely different embodiments of this invention may be made without departing from the spirit and scope thereof; and therefore, it is not intended to be limited except as indicated in the appended claims.

What is claimed is:

1. As new chemical compounds, the group which consists of 12-keto-10,11-dihydroxystearic acid, 12-keto-10,11-epoxystearic acid, salts of 12-keto-10,11-dihydroxystearic acid and salts of 12-keto-10,11-epoxystearic acid, said salts being members of the group which consists of sodium, potassium, ammonium hydroxide, pyridine, diethanolamine and triethanolamine salts of 12-keto-10,11-dihydroxystearic acid and 12-keto-10,11-epoxystearic acid.
2. 12-keto-10,11-dihydroxystearic acid.
3. 12-keto-10,11-dihydroxystearic acid sodium salt.
4. 12-keto-10,11-dihydroxystearic acid potassium salt.
5. 12-keto-10,11-epoxystearic acid.
6. 12-keto-10,11-epoxystearic acid sodium salt.
7. 12-keto-10,11-epoxystearic acid pyridine salt.
8. 12-keto-10,11-dihydroxystearic acid pyridine salt.

No references cited.